United States Patent
Marissal et al.

(10) Patent No.: US 7,241,859 B2
(45) Date of Patent: Jul. 10, 2007

(54) PROCESS FOR TREATING A POLYOLEFIN DISCHARGED FROM AN OLEFIN POLYMERIZATION REACTOR

(75) Inventors: Daniel Marissal, Braine-le-Comte (BE); Brent Walworth, Sint-Niklaas (BE)

(73) Assignee: Innovene Manufacturing Belgium NV, Antwerp (BE)

( * ) Notice: Subject to any disclaimer, the term of this patent is extended or adjusted under 35 U.S.C. 154(b) by 411 days.

(21) Appl. No.: 10/882,231

(22) Filed: Jul. 2, 2004

(65) Prior Publication Data

US 2005/0033016 A1 Feb. 10, 2005

(30) Foreign Application Priority Data

Jul. 3, 2003 (GB) ................................. 0315618.9

(51) Int. Cl.
*C08F 6/24* (2006.01)
*C08F 2/14* (2006.01)

(52) U.S. Cl. ........................... 528/501; 526/67; 526/68
(58) Field of Classification Search ................ 528/501; 526/67, 68
See application file for complete search history.

(56) References Cited

U.S. PATENT DOCUMENTS

| 4,501,885 A | * | 2/1985 | Sherk et al. | ................ 528/501 |
| 5,769,927 A | | 6/1998 | Gottschlich et al. | |
| 6,271,319 B1 | * | 8/2001 | Baker et al. | .................. 526/68 |
| 6,858,682 B2 | * | 2/2005 | Kendrick et al. | ............. 526/64 |

* cited by examiner

*Primary Examiner*—Fred Teskin
(74) *Attorney, Agent, or Firm*—Finnegan, Henderson, Farabow, Garrett, & Dunner, L.L.P.

(57) ABSTRACT

Process for treating polyolefin discharged from an olefin polymerization reactor which comprises steps of discharging from a polymerisation reactor a slurry comprising polyolefin and diluent; submitting said slurry to a pressure release such that the diluent is evaporated and a polyolefin/gas mixture is formed; discharging said polyolefin/gas mixture into a collecting vessel; controlling a level of settled polyolefin in the collecting vessel; discontinuously transferring the polyolefin/gas mixture in the collecting vessel into a concentrating vessel; and discharging said concentrator vessel in such a way that said polyolefin/gas mixture is transferred into the hydrocarbon purge bin.

Embodiments also comprise the use of two interconnected concentrator vessels and the optimized recovery of the diluent from the purge bin.

20 Claims, 1 Drawing Sheet

PROCESS FOR TREATING A POLYOLEFIN DISCHARGED FROM AN OLEFIN POLYMERIZATION REACTOR

The present invention relates to a process for treating a polyolefin discharged from an olefin polymerization reactor while minimizing the amount of diluent which is transferred from the reactor to a hydrocarbon purge bin and maximizing the recovery of said diluent from the purge bin.

In another aspect, the invention also comprises a process for treating the purge vent stream issued from the said purge bin.

According to practical embodiments, the process of the invention involves minimising the excess of gaseous diluent which is transferred from a flash vessel operating at medium pressure downstream of an olefin polymerization reactor to the hydrocarbon purge bin during the transfer of the raw polymer from the, polymerization reactor.

In typical so-called "slurry" olefin polymerization processes, the raw polymeric material coming from the polymerization reactor, which operates under comparatively high pressure (from 10 to 40 bars) and temperature (generally between 60 and 110° C.), is submitted to a pressure drop or pressure release and most of the recovered gas is separated by decantation or centrifugation in a collecting vessel. However, some, typically 10 to 20% by weight of the gas is not separated and is transferred to a so-called purge-bin operating at lower pressure. This means that a large amount of gaseous hydrocarbons from the polymerization reactor must be compressed back to high pressure—in a time and energy consuming step—before they can be recycled in the polymerization reactor.

On the other hand, when discharged from the polymerization reactor, the raw polymer slurry is in the form of a material containing significant amounts of diluent, smaller amounts of unreacted olefinic monomer(s) and which may contain small amounts of catalyst, cocatalyst, other hydrocarbons and any other material depending on the manufacturing process used (hereafter called under the collective term "contaminants"). After the pressure release, the raw polymer resin is passed into the above mentioned purge bin at about atmospheric pressure, where nitrogen is used to purge these contaminants out. The purge vent stream from this step contains nitrogen, diluent, olefinic monomer, and other process-specific materials.

Different techniques are known to separate the constituents of the purge vent stream and recycle them in the polymerization process.

In U.S. Pat. No. 5,769,927 is disclosed a method and an apparatus based on selective membranes-based gas separation to separate the constituents of the vent gas.

Another common means to separate and recycle the constituents of the vent gas is condensation under pressure.

Although these techniques give acceptable results as far as performance is concerned, the treatment of the vent gas is cumbersome and energy consuming, partially due to the fact that large quantities of the vent gas are recuperated under low pressures (close to atmospheric pressure) and major constituents like the monomer and the diluent have to be compressed to a high pressure before they can be recycled in the polymerization reactor.

The object of the present invention is to provide a process which minimizes the quantities of useful products present at low pressure to be recycled in a polymerization process.

Accordingly, in a first aspect the present invention provides a process for treating polyolefin discharged from an olefin polymerization reactor which comprises the following sequence of steps:

discharging from a polymerisation reactor a slurry comprising polyolefin and diluent;

submitting said slurry to a pressure release such that the diluent is evaporated and a polyolefin/gas mixture is formed;

discharging said polyolefin/gas mixture into a collecting vessel;

controlling a level of settled polyolefin in the collecting vessel discontinuously transferring the polyolefin/gas mixture in the collecting vessel into a concentrator vessel;

discharging said concentrator vessel in such a way that said polyolefin/gas mixture is transferred into the hydrocarbon purge bin.

The meaning of the following terms, as used throughout the present specification, is emphasized hereafter.

The term "gas" means a gas or a vapour.

The term "diluent" means a liquid or gaseous hydrocarbon under normal conditions (25° C., 1 bar), preferably a $C_3$–$C_8$-containing non polymerizable saturated hydrocarbon, used as a carrier of the polymer in the "slurry" reactor.

The term "slurry" means a suspension of polymer particles in a liquid or a gas.

The term "purge bin" means a device designed to free the raw polymer from the gases or liquids entrapped in the polymer particles; it encompasses a traditional purge bin, a dryer or any other suitable device with a significant residence time.

According to the process of the present invention, the collecting vessel is, optionally continuously, filled with the decompressed polyolefin/gas mixture coming from a polymerization reactor outlet.

The polyolefin/gas mixture is preferably heated, in the reactor discharge line to the collecting vessel, preferably after decompression. The temperature of the polyolefin/gas mixture is ideally heated to above the dewpoint of the gas mixture, most preferably 5–10° C. above the dewpoint. The object of the invention is to achieve powder within the collecting vessel that is as dry as possible both to reduce the degassing load on the downstream system but also to improve powder flowability within the vessel and from the collecting vessel to the concentrating vessel. The collecting vessel is designed to avoid potential for polymerization, condensation and/or solids build-up within the vessel. The polyolefin/gas mixture inlet into the collecting vessel is preferably tangential to the vessel wall and most preferably also angled downwards at an angle of between 5 and 25 degrees to the horizontal, most preferably at about 10 degrees to the horizontal to optimize sweeping of the wall of the collecting vessel. The collecting vessel is preferably insulated and traced both to maintain the powder temperature and to avoid potential for any condensation on any cold vessel walls. The vessel is also designed for uniform cross-sectional flow of solids in the base of the vessel through appropriate design of the cone angle, surface finish and the outlet nozzle size/configuration.

The residence time in the collecting vessel may be a balance between the degassing requirements of the resin and the desire to minimize potential for continued polymerization. This optimum will depend upon the resin characteristics (e.g. density, amorphous content, temperature) and the hydrocarbon types and quantities present. When treating high density polyethylene from a slurry process using hexene-1 comonomer and isobutane diluent, the solids level is preferably controlled within the conical base section of the collecting vessel, ideally maintaining the maximum level of solids in the collecting vessel a little more than the volume of solids required to completely fill a single downstream concentrating vessel, preferably at no more than 50% (most preferably 25%) more than the volume of solids required to completely fill that single concentrating vessel. In this case the solids residence time within the collecting vessel is typically between 20 and 400 seconds, most preferably between 40 and 200 seconds, ideally about 60 to 100 seconds.

The solids level in the collecting vessel is preferably measured using a continuous nuclear device, ideally compensated for the gas density in the vessel. As soon as the polyolefin/gas mixture reaches a predetermined level inside the collecting vessel, an intake valve in the concentrator vessel is opened and a predetermined volume of polyolefin/gas mixture collected in the collecting vessel is transferred to the concentrator vessel. The full benefit of the invention is achieved when the volume of polyolefin/gas mixture is such that the concentrator vessel is essentially completely filled i.e. a minimum quantity of effluent gases from the reactor is transferred into the concentrator vessel. Basically, only the interstices between the polymer-particles and the cavities in the particles themselves are filled with gas. Ideally, substantially the entire volume of the concentrator vessel is occupied by polymer particles. Preferably a small vent line, with a ball valve (eg 2.5 cm diameter), to a lower pressure vessel (such as a suitable parallel concentrator vessel or the purge bin) is opened when filling the concentrator vessel or most preferably at a point in the filling cycle when the solids flow into the concentrator vessel is starting to, or would otherwise start to, reduce. After the concentrator vessel has been filled with the polyolefin/gas mixture, the intake valve of the concentrator vessel is closed and the discharge valve of the concentrator vessel is opened. The concentrator vessel is emptied into a purge bin. A small flow of optional higher pressure gas (eg from the collecting vessel) may be used to assist transfer of solids from the concentrator vessel to the purge bin however this should not be necessary in a well designed system.

Ideally the system is designed to achieve a fast cycle time such that the concentrator vessel can be filled in a matter of a few seconds or less. Optionally, once the concentrator vessel has been filled it is left open to the collecting vessel for a further 5–20 seconds to enable the solids to completely subside in the concentrating vessel and thereby vent as much gas back to the higher pressure system without any compression. The sequencing of the inlet and outlet valves of the concentrating vessel is preferably controlled by timer however it may alternatively be based on primary (or additional) use of measurements of system status such as level and/or pressure indication.

Safety interlocks are preferably installed in the system to prevent the concentrator inlet valve being opened when the discharge valve is also open and vice versa. The status of these valves can be further confirmed from pressure verifications between the collecting vessel, the concentrator vessel and the purge bin.

When operating according to the invention it is not essential, or even generally particularly desirable, to always maintain a gas seal between the collecting and concentrating vessels during the discharge process. The only time when it is desirable to maintain a gas seal (eg with a certain solids level) in the collecting vessel is when any optional solids by-pass line around the concentrator vessel to the purge bin may be being used. Such a by-pass line would increase the gas leakage to the downstream system even with an appropriate gas seal however it is within the scope of the invention that such an additional solids flow to the purge bin may be considered.

The entire train of collecting vessel, concentrating vessel and purge bin are preferably designed and installed to permit reliable solids flow by gravity between the vessels. In this case the vessels do not necessarily need to be located vertically directly above each other however any slope of the connecting pipes is preferably designed to rely on gravity flow given the slope, the pipe internals and the powder characteristics (including its humidity). Whilst it may be preferred to design for gravity flow this is by no means a requirement of the invention. It is recognized that it would be entirely possible to contemplate reliable use of pneumatic transfer of solids between the vessels where other considerations such as cost, layout etc make use of a single elevation less attractive.

The process of the invention can be applied to any polymer manufacturing process. The process of the invention is particularly useful in the manufacture of polymers derived from monomers selected among α-olefins (hereafter referred to as "olefins") containing from 2 to 18 carbon atoms, preferably α-olefins containing from 2 to 8 carbon atoms. These polymers may be:

homopolymers, such as high and low density polyethylene; polypropylene; polybutene; poly(4-methyl-pentene-1);

copolymers of these monomers with at least one different comonomer selected among monoolefins containing from 2 to 18 carbon atoms, preferably 2 to 8 carbon atoms; and diolefins containing from 4 to 18 carbon atoms. Examples of these copolymers, well known in the art, are copolymers of more than 50% mole ratio of ethylene with butene, hexene and/or octene as well as random and block copolymers of more than 50% mole ratio of propylene with ethylene and/or butene. The process of the invention is particularly suitable in the manufacture of homo- and copolymers of ethylene and of propylene, and more particularly in the manufacture of high density polyethylene.

The process of the invention is further of particular use in the manufacture of the above mentioned polymers, where isobutane, pentane, propane or hexane are used as liquid diluent in the slurry reactors. Hexane and isobutane are preferred liquid diluents in the case of the manufacture of high density polyethylene.

A substantial advantage of the process of the present invention lies in the fact that, instead of transferring the polyolefin/gas mixture directly from the polymerization reactor—respectively directly from the collecting vessel—to the purge bin together with an important quantity of gas from the polymerization reactor, a concentrator vessel is used between the polymerization reactor respectively between the collecting vessel and the purge bin. The quantity of gas transferred from the polymerization reactor to the purge bin is thus minimized. Usually, the polymerization reactor is under high pressure (10–40 bars) whereas the purge bin is at a pressure close to the atmospheric pressure. The less effluent gas is taken out of the collecting vessel, the less gas must be recycled and pressurized to the higher pressure required in the polymerization reactor. The use of the concentrator vessel as described above allows to decrease the quantity of gas that is transferred to the low pressure side i.e. to the purge bin. For instance, when isobutane is used as diluent for the polymerization and when the pressure in the second step of the process of the invention drops to about 5 to 11 bara, typically 10 bara, the quantity of gas transferred to the purge bin is reduced to about 2 to 5 weight %, typically 2.5 weight %, where the weight percent is the mass percent of gas in the total mass of the stream transferred. Consequently the compressors can be of smaller size, they are thus less costly to buy and to operate. Furthermore, since the quantity of unreacted monomer and solvent that must be recycled is smaller, the downstream recycling equipment may be smaller and less energy-consuming.

According to a preferred embodiment of the process of the invention, instead of using one concentrator vessel, two or more concentrator vessels are operated in parallel. For the purposes of the present specification, these concentrator vessels are respectively named "first concentrator vessel" and either "parallel concentrator vessel" or "second concentrator vessel".

Hence, in the first part of the cycle, the first concentrator vessel is filled with the polyolefin/gas mixture and the intake valve of the first concentrator vessel is closed. Before the first concentrator vessel is emptied into the purge bin, a pressure compensation valve connecting the two concentrator vessels is opened. Gas contained in the first concentrator vessel is transferred to the parallel concentrator vessel until the pressure in the two concentrator vessels is about the same. The pressure compensation valve between the concentrator vessels is then closed and the first concentrator vessel is emptied into the purge bin. The pressure inside the first concentrator vessel drops to the pressure inside the purge bin whereas the pressure in the parallel concentrator vessel is higher than the pressure inside the purge bin but lower than the pressure in the collecting vessel, i.e. about 30–50% lower.

In the second part of the cycle, the parallel concentrator vessel will be filled with the polyolefin/gas mixture from the collecting vessel and the pressure between the two concentrator vessels is equilibrated by opening the pressure compensation valve connecting the two concentrator vessels. The parallel concentrator vessel will eventually be emptied into the purge bin.

The method using alternatively two or more concentrator vessels in parallel reduces the quantity of gas transferred from the polymerization reactor—respectively from the collecting vessel—to the low pressure side i.e. to the purge bin still further. For instance, when isobutane is used as diluent for the polymerization and when the pressure in step (b) drops to about 5 to 11 bara, typically 10 bara, the quantity of gas transferred to the purge bin is reduced to about 0.75 to 1.75 weight %, typically 1 weight %. These figures depend on the bulk density of the polymer and on the density and type of the gas.

According to another aspect, the invention further comprises a process for treating the purge vent stream issuing from the above process.

In a practical embodiment thereof, the process in accordance with the invention further includes the following steps to treat the purge vent stream from the purge bin:

compressing and cooling a purge vent stream from a purge bin, resulting in partial condensation of the stream, thereby dividing the stream into a condensed portion enriched in monomer and an uncondensed portion enriched in purge gas;

dividing the uncondensed portion into two parts, recirculating the first part of the uncondensed portion to the purge bin;

treating the second part of the uncondensed portion in a separation unit, to create a more-enriched purge gas stream and a mixed stream;

recirculating the enriched purge gas stream from the separation unit at the bottom or at an intermediate level of the purge bin and recirculating the mixed stream from the separation unit to the condensation step, by returning them to the purge vent stream upstream of the compression.

The process for treating the purge vent stream is very economical. Indeed, since the quantities and the concentration of monomers and other recyclable products coming from the purge bin are smaller than in traditional-processes, the equipment, i.e. the compression/cooling and separation units need not be very large. They are less costly to buy and to operate.

Furthermore, to recycle the first part of the uncondensed portion directly to the purge bin further reduces the size, costs and energy consumption of the equipment.

The condensation step is preferably carried out at a pressure comprised between about 8 to 20 bar; when isobutane is used as diluent for the polymerization, said pressure is typically comprised between 12 and 16 bar. The condensation step is preferably further carried out at a temperature comprised between −30 and +50° C.; when isobutane is used as diluent for the polymerization, said temperature is typically comprised between 5 and 30° C., preferably between 10 and 15° C.

The separation unit may comprise a membrane separation unit, a cryogenic separation unit, an absorption unit, etc. In the case of a cryogenic separation, the unit comprises a distillation column with a condenser operating at low temperature, for instance in the range of −50 to −100° C.

The separation by means of a membrane is preferred. It is preferably carried out by using a membrane that has a selectivity for the faster permeating component—i.e. the olefin—over the other component—i.e. the purge gas—of at least about 5.

It should be noted that the above process for minimizing the quantity of gas, which is transferred from a polymerization reactor to a hydrocarbon purge bin, can be applied to any polymer manufacturing operation.

This invention provides an optimized degassing process that minimizes the quantity of hydrocarbons withdrawn with the polyolefin from the polymerization reactor that is let down to a pressure below 7 bara, preferably 5 bara. It additionally allows the energy and fresh make-up purge gas requirements for the entire degassing process and most particularly the purge bin system to be reduced. This invention provides a process for treating polyolefin wherein greater than 95% wt, preferably greater than 97 wt %, of the hydrocarbons discharged with the polyolefin from an olefin polymerization reactor are recycled to a polymerization reactor as liquid and wherein the polyolefin gas mixture discharged to the purge bin contains less than 2.5 wt % gas, preferably less than 1 wt % gas. In a preferred embodiment the purge bin uses primarily recycled purge gas and has a fresh make-up purge gas requirement of less than 5 $Nm^3$/te of polyolefin, more preferably less than 1 $Nm^3$/te of polyolefin, most preferably the entire purge gas used in the purge bin is recycled. Where any fresh make up purge gas is introduced to the purge bin it is preferably an inert gas, most preferably nitrogen. This invention provides a process for achieving the above performance whilst treating the polyolefin leaving the purge bin such that it contains less than 100, most preferably less than 40 ppm Volatile Organic Compounds (VOCs) and consuming less than 15 kW/te, preferably less than 10 kW/te of polymer produced of energy to purify and recycle the purge gas around the purge bin.

The present invention will be more apparent from the following description of a not limiting embodiment with reference to the attached drawings, wherein FIG. 1 (FIG. 1) is a schematic view of the polymer concentrator according to a preferred embodiment of the present invention;

Figure 1:
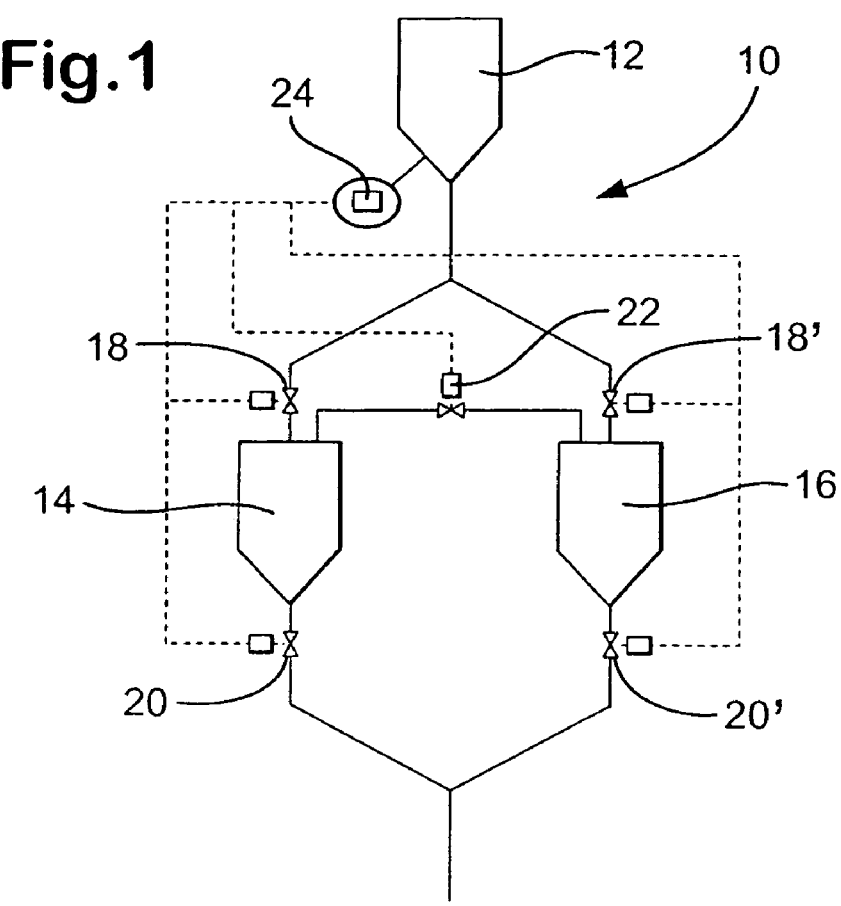
FIG. 1 depicts the polymer concentrator according to a preferred embodiment of the present invention.

The polymer concentrator 10 as shown comprises:
a collecting vessel 12 for receiving the raw polymer and an effluent gas form the polymerization reactor (not shown),
a first 14 and a second 16 concentrator vessel in parallel, each having intake valves 18 and 18' and outlet valves 20 and 20',
a pressure compensation valve 22 connecting the two concentrator vessels,
a measuring device (not shown) for measuring a predetermined quantity/volume of raw polymer in said collecting vessel means and
a switch 24—e.g. a level switch—operating said intake and outlet valves A slurry of raw polymer particles and effluent gas from a polymerization reactor (not shown) is continuously transferred to the collecting vessel 12. The slurry of raw polymer and effluent gas is allowed to settle in the collecting vessel 12 and as soon as the slurry reaches a predetermined level in the collecting vessel 12, the switch 24 opens an intake valve 18 of the first concentrator vessel 14 and the first concentrator vessel 14 is filled with the slurry coming from the collecting vessel 12. The quantity/volume of raw polymer transferred to the collecting vessel is such that the concentrator vessel 14 is filled to the top with raw polymer, the quantity of effluent gas in the concentrator vessel 14 is minimized. As soon as the first concentrator vessel 14 is filled, the intake valve 18 is closed and the pressure compensation valve 22 connecting the two concentrator vessels 14, 16 is opened. Effluent gas contained in the first concentrator vessel 14 is transferred to the second concentrator vessel 16. When the pressure between the two concentrator vessels 14,16 is equilibrated, the pressure compensation valve 22 is closed and the switch 24 opens the outlet valve 20 of the first concentrator vessel 14. The raw polymer is transferred into the purge bin (not shown). The pressure in the first concentrator vessel 14 drops to the pressure of the purge bin whereas the pressure in the second concentrator vessel 16 is about 30%–50% of the pressure of the collecting vessel 12/polymerization reactor.

In the meantime, the collecting vessel 12 is filled again with raw polymer and effluent gas and the switch 24 opens the intake valve 18' of the second concentrator vessel 16 which is filled to the top with raw polymer and effluent gas from the collecting vessel 12. Since there is still a certain amount of effluent gas in the second collecting vessel 16, less effluent gas is transferred from the collecting vessel 12. The intake valve 18 is closed and the pressure compensation valve 22 is opened. Effluent gas from the second concentrator vessel 16 is transferred to the first concentrator vessel 14. The pressure compensation valve 22 is closed and the outlet valve 20' of the second concentrator vessel 16 is opened to transfer the raw polymer together with the effluent gas into the purge bin. The pressure in the second concentrator vessel 16 drops to the pressure of the purge bin whereas the pressure in the first concentrator vessel 14 is about 30%–50% of the pressure of the collecting vessel/ polymerization reactor.

The cycle may start over again.

Figure 2:
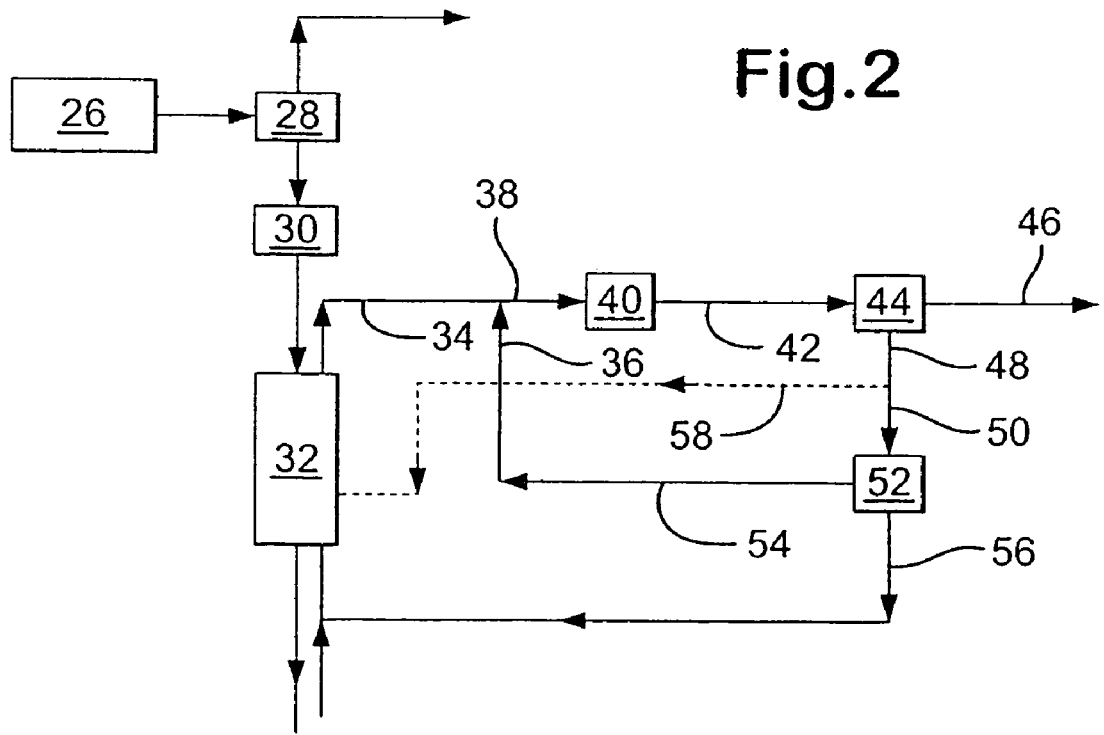
FIG. 2 (FIG. 2) is a schematic view of the process for the treatment of the purge vent stream according to the present invention.

FIG. 2 is a schematic view of the treatment of the purge vent stream according to the present invention.

A purge vent stream from a polymer manufacturing operation typically emanates from the resin purge bins, where a gas is used to purge contaminants from the newly formed polymer particles. These contaminants are process-specific, depending upon which polymer is being manufactured, the purity of the starting ingredients, and whether the process is a gas-phase process, a slurry process or any other process which would generate a gas/solid mixture at medium pressure (5–25 bar). The contaminants may include unreacted monomer and comonomers, solvents, catalysts, stabilizers, other hydrocarbons, or any other materials used or present in the polymerization reactor. To give just one specific example, if nitrogen is used for purging and the purge vent stream comes from slurry polyethylene manufacturing, it contains—in addition to significant amounts of ethane—ethylene, hydrogen, diluent and nitrogen and sometimes other contaminants.

The process of the invention can be applied to any polymer manufacturing process that generates a purge vent stream containing volatile hydrocarbons. Most commonly, the purge gas used by polymer makers is nitrogen, which is inert and readily available. It will be appreciated, however, that the process is usable for separating other purge gases that might be used, such as air, or any other gas found to be suitable for this purpose.

The principal goal of this part of the process is to separate the diluent from the gas used for purging the raw polymer, most preferably to such an extent that either or both are reusable.

Reverting now to FIG. 2, it can be seen that the raw polymer slurry is transferred from a polymerization reactor 26 to a collecting vessel 28, then to a concentrator vessel 30 and finally to the purge bin 32.

The treatment of the purge vent steam will now be described in more detail. The purge vent stream 34, having been combined with recirculated stream 36 to form an inlet stream 38, passes first through a compressor 40 to form a compressed stream 42 which then passes through a condenser 44 or chiller. The combination of compression and cooling results in the formation of a condensed stream 46 containing the diluent with small amounts of dissolved olefin monomer(s) (and other organic materials if present in the feed), but also containing some dissolved or condensed purge gas, and an uncondensed stream 48 with purge gas still: containing some diluent and olefin monomer(s).

The condensed stream 46 or condensate is directly recycled in the polymerization reactor 26 after possible further treatment, known in the art The uncondensed stream 48 is divided into two parts. The one part 50 of the uncondensed stream 48 is fed to a separation unit 52, in this particular case a membrane separation unit. The membrane separation unit contains a membrane that is selective for the diluent and the monomer over the purge gas. Typically, a pressure difference between the feed and permeate sides of the membrane large enough to provide sufficient driving force for transmembrane permeation is provided by the upstream compressor 40. The membrane separation unit produces two streams, a residue stream 56 and a permeate stream 54. The residue stream 56 is the purge-gas-enriched product stream, which may be returned to the purge bin. The permeate stream 54 which is enriched in diluent and monomer content compared with membrane feed stream 50 is usually returned to the inlet side of the compressor 40 for further processing.

The other part 58 of the uncondensed stream 48 is recycled directly towards the purge bin 32. Since a concentrator vessel 30 or two concentrator vessels in parallel are used, the quantity or debit of gas from the reactor 26 that is transferred together with the raw polymer into the purge bin 32 is very small: The concentration of unreacted monomer, diluent and sometimes other contaminants in the purge vent stream 34 is therefore much lower than in conventional processes. It has been found that it is not necessary to further treat at least a part of the uncondensed portion containing mainly nitrogen and smaller quantities of monomer to be able to use it as a purge gas in the purge bin. In the purge bin, "pure" nitrogen is injected through the bottom and the gas rises inside the purge bin through the raw polymer. During the purge, the nitrogen flushes the gas containing monomer, diluent and other contaminants, which is entrapped inside and between the raw polymer particles and thus becomes charged with the entrapped gas. It has been found that one part of the uncondensed portion can be injected directly into the purge bin without any further treatment. This injection of the uncondensed stream takes place at a certain height above the injection of the "pure" nitrogen, which is injected through the bottom of the purge bin. At this height, the concentration of monomer and other contaminants in the purge gas rising inside the purge bin is about the same or higher than the concentration of these products in the uncondensed part, which is injected.

In FIG. 2, the stream 36 recirculated to the condensation step are shown as returned to mix with the feed stream 34 upstream of the compressor 40.

The goal of the condensation step is to bring the inlet gas stream to a pressure/temperature condition beyond the dewpoint of the olefin or other monomer that is to be recovered, so that a portion of that component will condense out of the gas stream in liquid form. The amount of monomer that can be removed from the gas stream in this way will depend on the boiling point, the concentration in the feed, and the operating conditions under which the condensation is performed.

The conditions under which the condensation step is carried out influence the compositions of both the condensed and uncondensed portions.

For simplicity, the condenser or chiller in FIG. 2 is identified by a single box 44, from which the condensate liquid and remaining gas are shown emerging as discrete streams. It will be appreciated that, in practice, the condenser will often comprise a chiller, which produces a gas/liquid mixture, and a phase separator, in which the phases are separated and from which they are withdrawn as discrete streams.

The second unit separation process can be a membrane separation. The membrane unit contains a membrane that exhibits a substantially different permeability for the monomer gas than for the purge gas. It may be relatively permeable to the diluent and monomer but relatively impermeable to the purge gas, or relatively permeable to the purge gas but relatively impermeable to the monomer. It is of more common practice to use a membrane selective for the hydrocarbons.

As already mentioned, the membranes should preferably have a selectivity for the faster-permeating component over the other component of at least about 5, more preferably at least about 10 and most preferably at least about 20.

The treatment of the purge vent stream is now illustrated in further detail by one specific example carried out in a unit like the one shown by FIG. 2. This example is intended to further clarify the process according to the invention, and is not intended to limit the scope in any way.

EXAMPLE

A slurry stream issues continuously from the polymerization reactor 26 at a rate of 250 kg/h of high density polyethylene (HDPE), 300 kg/h of isobutane (iBu) and 15 kg/h of unreacted ethylene (Et). It is depressed to 12 bara and discharged in the collecting vessel 28 where a gas-solid separation occurs, whereby a stream of 294 kg/h of iBu and 14.7 kg/h of Et is discharged from the top thereof while the remaining part is discharged into the concentrator vessel 30. A stream of 250 kg/h of HDPE, 6 kg/h of iBu and 15 kg/h of Et is transferred to the purge bin 32, delivering in turn, at the bottom thereof, 250 kg/h of HDPE together with only 0.1 kg/h of iBu. At the top of purge bin 32 is delivered a stream of 6.1/h kg of iBu, 0.5 kg/h of Et and 6 kg/h of nitrogen (N2) (which was introduced at the bottom of purge bin 32), which is conveyed as stream 34 under a pressure of 1.2 bara, together with recirculated stream 36 (see later), through compressor 40, where it is compressed to 16 bara, to form the stream 42 of 15.6 kg/h of iBu, 3.5 kg/h of Et and 14 kg/h of N2. Stream 42 passes then through the condenser 44. The condensed stream 46, 5.866 kg/h of iBu, 0.27 kg/h of Et and 0.3 kg/h of N2 is recycled to the polymerization after a treatment (not shown) enabling the recovery of N2.

The uncondensed stream issuing from the condenser through line 48 is divided into one stream, 50. which is 9:734 kg/h of iBu, 3.23 kg/h of Et and 13.7 kg/h of N2 which feeds the membrane separation unit 52. The other part 58 of the uncondensed stream 48 is recycled to the purge bin 32.

The residue stream 56 produced by the membrane separation unit, 0.234 kg/h of iBu, 0.230 kg/h of Et and 5.7 kg/h of N2, is sent back to the purge bin 32 successively after a purge step (not shown) delivering a stream of 0.034 kg/h of iBu, 0.030 kg/h of Et and 5.7 kg/h of N2 and after a make-up of N2 at the rate of 1 kg/h.

The permeate stream 54 produced by the membrane separation unit, which is 9.5 kg/h of iBu, 3 kg/h of Et and 8 kg/h of N2, is sent back to the inlet side of the compressor 40.

REFERENCE LIST 10 polymer concentrator
12 collecting vessel
14 $1^{st}$ concentrator vessel
16 $2^{nd}$ concentrator vessel
18,18' intake valves
20,20' outlet valves
22 pressure compensation valve
24 switch
26 polymerization reactor
28 collecting vessel
30 concentrator vessel
32 purge bin
34 purge vent stream
36 recirculated stream
38 inlet stream
40 compressor 42 compressed stream
44 condenser
46 condensed stream
48 uncondensed stream
50 one part of the uncondensed stream
52 separation unit
54 permeate stream
56 residue stream
58 other part of the uncondensed stream

We claim:

1. A process for treating polyolefin discharged from an olefin polymerization reactor which comprises the following sequence of steps:
   1) discharging from a polymerization reactor a slurry comprising polyolefin and diluent;
   2) submitting said slurry to a pressure release such that the diluent is evaporated and a polyolefin/gas mixture is formed;
   3) discharging said polyolefin/gas mixture into a collecting vessel;
   4) controlling a level of settled polyolefin in the collecting vessel;
   5) discontinuously transferring the polyolefin/gas mixture in the collecting vessel into a concentrator vessel; and
   6) discharging said concentrator vessel in such a way that said polyolefin/gas mixture is transferred into a hydrocarbon purge bin.

2. Process according to claim 1 wherein the collecting vessel is fed continuously.

3. Process according to claim 1 wherein two or more concentrator vessels are operated in parallel.

4. Process according to claim 1 wherein the collecting vessel is discharged continuously but the polyolefin/gas mixture is transferred to the concentrator vessel discontinuously.

5. Process according to claim 3 wherein following the filling of one concentrator vessel, the pressure is equilibrated to a parallel concentrator vessel at a lower pressure prior to discharging said filled concentrator vessel.

6. Process according to claim 5 further comprising the following successive steps:
   a) opening the intake valve of a first concentrator vessel which also has a discharge valve in such a way that a predetermined volume of said polyolefin/gas mixture is transferred into said first concentrator vessel;
   b) closing the intake valve of said first concentrator vessel;
   c) opening a pressure compensation valve connecting said first concentrator vessel to a parallel concentrator vessel, said parallel vessel also comprising an intake valve and a discharge valve, so as to equilibrate the pressure between the first and parallel concentrator vessels;
   d) closing said pressure compensation valve;
   e) opening the discharge valve of said first concentrator vessel so that the polyolefin/gas mixture is transferred into a hydrocarbon purge bin;
   f) opening the intake valve of said parallel concentrator vessel when the polyolefin/gas mixture has reached a predetermined level in said collecting vessel;
   g) filling said parallel concentrator vessel with the polyolefin/gas mixture;
   h) closing the intake valve of said parallel concentrator vessel;
   i) opening the pressure compensation valve connecting said first concentrator vessel to said parallel concentrator vessel so as to equilibrate the pressure between the first and second concentrator vessels;
   j) closing said pressure compensation valve; and
   k) opening the discharge valve of said parallel concentrator vessel so that the polyolefin/gas mixture is transferred into said hydrocarbon purge bin.

7. Process according to claim 6 further including the following steps:
   l) purging said hydrocarbon purge bin with a purge gas and producing a purge vent stream;
   m) compressing and cooling said purge vent stream, resulting in partial condensation of the stream, thereby dividing the stream into a condensed portion enriched in diluent and an uncondensed portion enriched in purge gas;
   n) dividing the uncondensed portion into two parts;
   o) recirculating the first part of the uncondensed portion to the purge bin;
   p) treating the second part of the uncondensed portion in a separation unit, to create a purge gas enriched stream and a mixed stream; and
   q) recirculating the enriched purge gas stream to the purge bin and returning the mixed stream to the purge vent stream, upstream of the compression step.

8. Process according to claim 7 wherein the separation unit comprises a membrane separation unit.

9. Process according to claim 7 wherein the separation unit comprises a membrane separation unit having a selectivity for olefin over a purge gas of at least 5.

10. Process according to claim 1 wherein the polyolefin/gas mixture discharged from the concentrator vessel contains less than 2.5 wt % gas.

11. Process according to claim 10 wherein the polyolefin/gas mixture discharged from the concentrator vessel contains less than 1.75 wt % gas.

12. Process according to claim 7 wherein the ratio of fresh make-up purge gas to recycled purge gas used in the purge bin is less than 0.15.

13. Process according to claim 1 wherein greater than 95 wt % of the hydrocarbons discharged with the polyolefin from an olefin polymerization reactor are recycled to a polymerization reactor as liquid.

14. Process according to claim 1 wherein a purge gas is introduced into the purge bin and is recycled and a flow of fresh make-up purge gas introduced into the purge bin is less than 5 Nm$^3$/te of polyolefin.

15. Process according to claim 1 wherein a purge gas is introduced into the purge bin and the entire purge gas used in the purge bin is recycled and less than 15 kW of energy per ton of polymer produced is consumed in purifying and recycling the purge gas around the purge bin.

16. Process according to claim 1 wherein treated polyolefin leaving the purge bin contains less than 40 ppm VOC.

17. The process of claim 11 wherein the mixture contains less than 1 wt %.

18. The process of claim 12 wherein the ratio is less than 0.05.

19. The process of claim 14, wherein the flow of fresh make-up purge gas is less than 1 Nm$^3$/te of polyolefin.

20. The process of claim 19 wherein the entire purge gas used in the purge bin is recycled.

* * * * *